(12) United States Patent
Lee et al.

(10) Patent No.: US 11,557,779 B2
(45) Date of Patent: Jan. 17, 2023

(54) METHOD OF LIMITING CURRENT OF FUEL CELL STACK

(71) Applicants: Hyundai Motor Company, Seoul (KR); Kia Motors Corporation, Seoul (KR)

(72) Inventors: Seung Yoon Lee, Seoul (KR); Sae Byeok Seung, Gyeonggi-do (KR); Jeong Kyu Park, Gyeonggi-do (KR); Sang Chul Yeom, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 475 days.

(21) Appl. No.: 16/673,183

(22) Filed: Nov. 4, 2019

(65) Prior Publication Data

US 2020/0328433 A1 Oct. 15, 2020

(30) Foreign Application Priority Data

Apr. 10, 2019 (KR) .......................... 10-2019-0041722

(51) Int. Cl.
| | | |
|---|---|---|
| *H01M 8/04858* | (2016.01) | |
| *H01M 8/04537* | (2016.01) | |
| *H01M 8/04664* | (2016.01) | |
| *B60L 50/71* | (2019.01) | |
| *B60L 58/30* | (2019.01) | |
| *B60L 15/20* | (2006.01) | |

(52) U.S. Cl.
CPC ....... *H01M 8/0491* (2013.01); *B60L 15/2045* (2013.01); *B60L 50/71* (2019.02); *B60L 58/30* (2019.02); *H01M 8/04559* (2013.01); *H01M 8/04679* (2013.01); *B60L 2240/14* (2013.01); *B60L 2240/549* (2013.01); *H01M 2250/20* (2013.01)

(58) Field of Classification Search
None
See application file for complete search history.

(56) References Cited

U.S. PATENT DOCUMENTS

2001/0016276 A1* 8/2001 Yamanashi ............ B60L 58/34
429/431

* cited by examiner

*Primary Examiner* — Sarah A. Slifka
(74) *Attorney, Agent, or Firm* — box Rothschild LLP (57) ABSTRACT

A current limiting method of a fuel cell stack is capable of preventing current of the fuel cell stack from rapidly dropping to prevent jerking or shock from occurring while a vehicle travels. The method includes: determining whether performance deterioration of a unit cell of the fuel cell stack has occurred, employing a feed forward control type current limiting logic of the fuel cell stack before an output of the fuel cell vehicle is lowered, decreasing the current of the fuel cell stack to a predetermined level by the feed forward control type current limiting logic, and gradually restoring the current of the fuel cell stack to a maximum current usage value from a point in time when the current of a load is used.

10 Claims, 8 Drawing Sheets

METHOD OF LIMITING CURRENT OF FUEL CELL STACK

CROSS-REFERENCE TO RELATED APPLICATION

This application claims under 35 U.S.C. § 119(a) the benefit of Korean Patent Application No. 10-2019-0041722 filed on Apr. 10, 2019, the entire contents of which are incorporated herein by reference.

BACKGROUND

(a) Technical Field

The present disclosure relates to a current limiting method of a fuel cell stack, more particularly, to a method of limiting current of the fuel cell stack, which is capable of preventing deterioration of a driving feeling of a fuel cell vehicle and improving durability of the fuel cell stack.

(b) Description of the Related Art

In general, a fuel cell system applied to a fuel cell vehicle includes a hydrogen supply device for supplying hydrogen (fuel) to a fuel cell stack; an air supply device for supplying oxygen (air) to the fuel cell stack for carrying out an electrochemical reaction; and the fuel cell stack for generating electric energy by electrochemical reaction based on hydrogen supplied from the hydrogen supply device and oxygen supplied from the air supply device.

Typically, the fuel cell stack is manufactured as a structure in which several hundred unit cells are stacked. Each cell unit includes a polymer electrolyte membrane, a cathode and an anode which are catalyst layers applied to both surfaces of the electrolyte membrane such that hydrogen and oxygen react, gas diffusion layers (GDLs) stacked on outer portions of the cathode and the anode, and separation plates stacked on outer portions of the gas diffusion layers to supply fuel and to discharge water generated by reaction.

As described above, in the fuel cell stack including several hundred cells or more, each cell has unique performance and a current generation region.

Therefore, the fuel cell vehicle travels by charging a battery with current generated in the fuel cell stack and then discharging current to a driving motor or by directly supplying current to the driving motor.

However, when the fuel cell stack is aged and performance of one unit cell or several cells deteriorates, each cell cannot fully generate current. In this state, when current generation of the overall stack is reduced, performance of a cell having deteriorated performance as compared to other cells may further rapidly deteriorate.

Further, a hot spot and a pin hole due to deterioration may occur in the electrolyte membrane of the cell having the deteriorated performance, thereby causing function loss of the cell and further deteriorating performance of the overall stack.

In order to prevent such problems, when performance of one unit cell or several cells of the fuel cell stack deteriorates, a current limiting logic for limiting the amount of current generated in the fuel cell stack is used.

That is, when performance of one unit cell or several cells configuring the fuel cell stack deteriorates, a controller performs a current limiting logic for limiting the amount of current generated in the fuel cell stack, such that the fuel cell stack supplies only limited current to a load (e.g., the driving motor).

When the current of the fuel cell stack is significantly less than an original level (e.g., maximum current usage value) is supplied to the load by the existing current limiting logic, the output of the fuel cell vehicle is rapidly lowered and jerking or shock occurs while the fuel cell vehicle travels due to the rapidly lowered output, thereby lowering a driving feeling.

Figure 1:
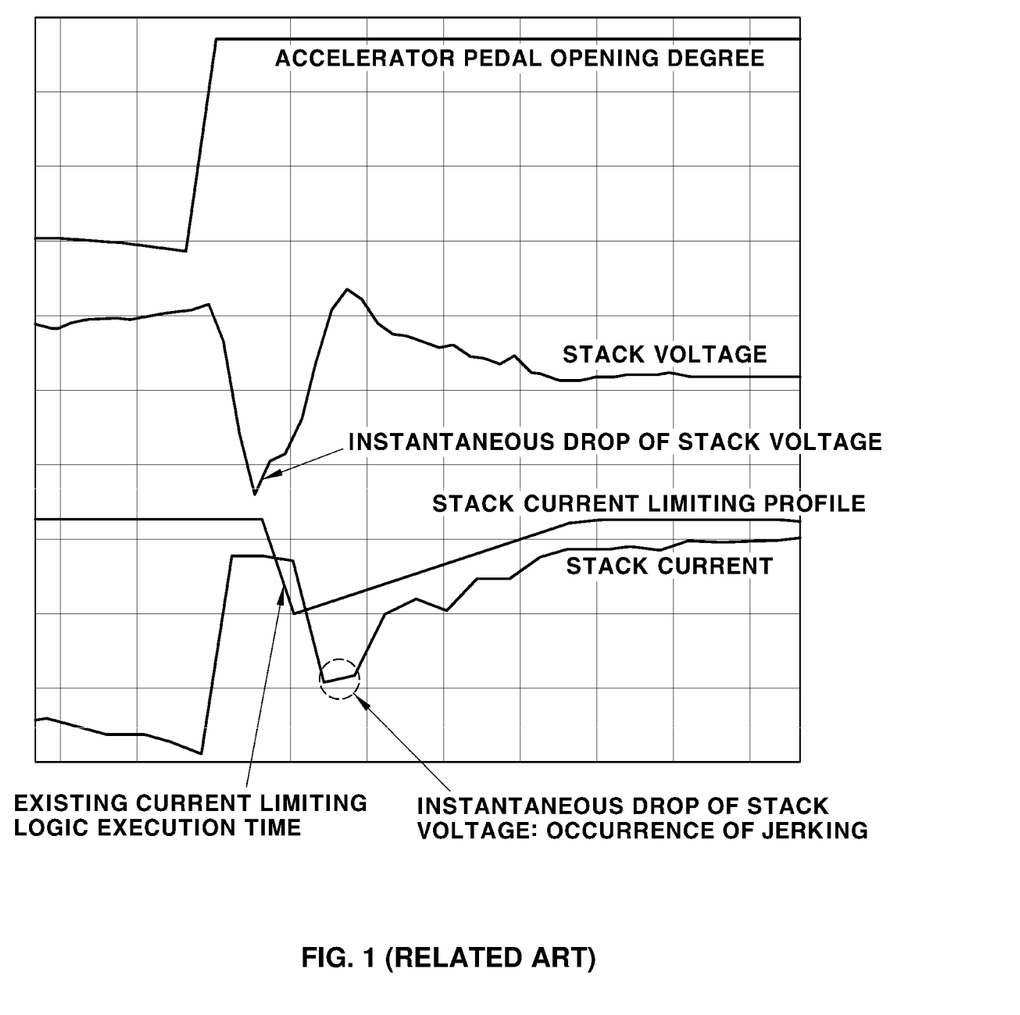
FIG. 1 (RELATED ART) is a control profile showing an existing fuel cell stack current limiting method.

Specifically, as shown in FIG. 1 (RELATED ART), when the current generated by the fuel cell stack instantaneously drops (see a circle denoted by a hidden outline of FIG. 1) by an existing current limiting logic (see a stack current limiting profile of FIG. 1) in a state in which a driver presses an accelerator pedal (see a section, in which an accelerator pedal opening degree rises, of FIG. 1), the instantaneously dropped current of the fuel cell stack is supplied to a load (e.g., the driving mode) to instantaneously drop the output of the fuel cell vehicle, and jerking or shock occurs while the vehicle travels due to the instantaneously dropped output, thereby lowering the driving feeling.

In addition, since the existing current limiting logic is a feedback control method performed in a state in which performance deterioration has already occurred, without predicting performance deterioration of the cell, damage to a unit cell adversely affects overall stack performance, thereby continuously causing durability deterioration in the fuel cell stack.

SUMMARY

The present disclosure provides a current limiting method of a fuel cell stack, which is capable of preventing current of the fuel cell stack from rapidly dropping to prevent jerking or shock from occurring while a vehicle travels, by determining whether performance deterioration of a unit cell of the fuel cell stack has occurred, employing a feed forward control type current limiting logic of the fuel cell stack before the output of the fuel cell vehicle is lowered, decreasing the current of the fuel cell stack to a predetermined level by the feed forward control type current limiting logic, and gradually restoring the current of the fuel cell stack to a maximum current usage value from a point in time when the current of a load is used.

In one aspect, a current limiting method of a fuel cell stack includes a controller limiting the current of the fuel cell stack to a current limiting value lower than a maximum output current of the fuel cell stack by a predetermined level when performance deterioration of the fuel cell stack occurs, determining whether a vehicle is accelerated, and releasing current limiting of the fuel cell stack such that an output current of the fuel cell stack is restored to the maximum output current, upon determining that the vehicle is accelerated.

In a preferred embodiment, the determining of whether the vehicle is accelerated may include the controller checking an accelerator pedal opening degree (e.g., as actuated by a driver's operation) and determining that the vehicle is accelerated when the accelerator pedal opening degree reaches a predetermined opening degree.

In a preferred embodiment, the limiting of the current of the fuel cell stack may include performing a primary current limiting step to an n-th current limiting step.

In a preferred embodiment, the primary current limiting step may include limiting the output current of the fuel cell stack to a primary current limiting value K1 lower than the maximum output current of the fuel cell stack by a predetermined level K1%, the secondary current limiting step may include limiting the output current of the fuel cell stack to a secondary current limiting value K2 lower than the maximum output current of the fuel cell stack by a predetermined level K2%, and the n-th current limiting step includes limiting the output current of the fuel cell stack to an n-th current limiting value Kn which is a maximum current limiting value of the fuel cell stack.

In particular, the releasing of the current limiting of the fuel cell stack may include increasing and restoring a current limiting value according to the current limiting of the fuel cell stack toward the maximum output current of the fuel cell stack with a predetermined current limiting release slope M.

In a preferred embodiment, when performance deterioration of the fuel cell stack has not occurred, the controller may restore the current limiting value of the fuel cell stack to a level used in a previous current limiting step or a maximum current usage value allowed in a state of initializing the fuel cell stack.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the exemplary embodiments of the present disclosure will be described in detail with reference to the accompanying drawings to allow those skilled in the art to easily practice the exemplary embodiments.

Figure 2:
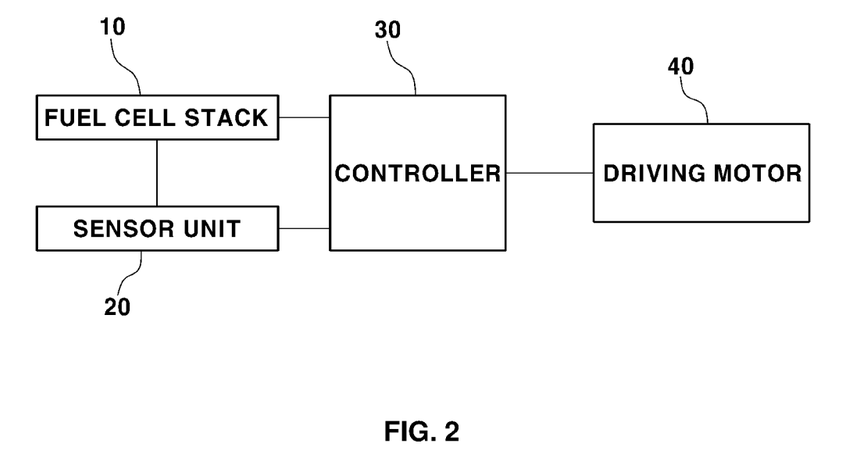
FIG. 2 is a view showing a control configuration for a current limiting method of a fuel cell stack according to the present disclosure.
Figure 3A:
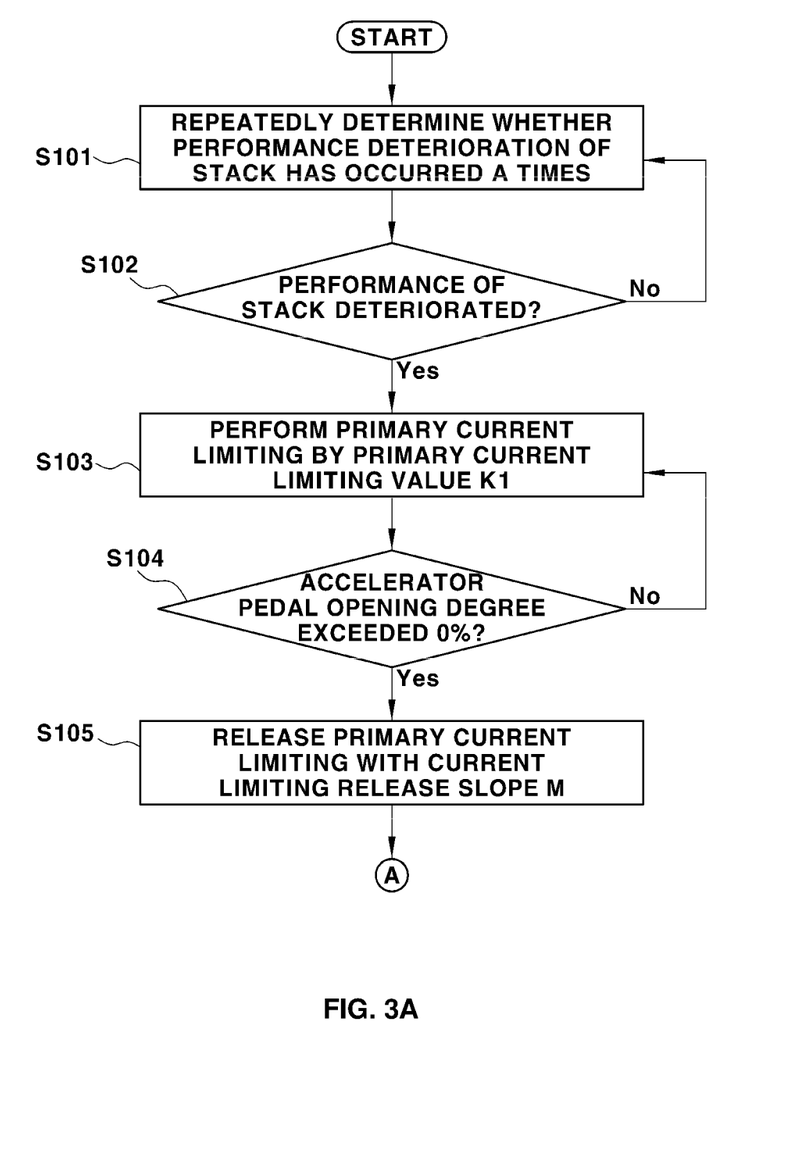
FIGS. 3A to 3C are flowcharts illustrating an example of a current limiting method of a fuel cell stack according to the present disclosure.
Figure 3B:
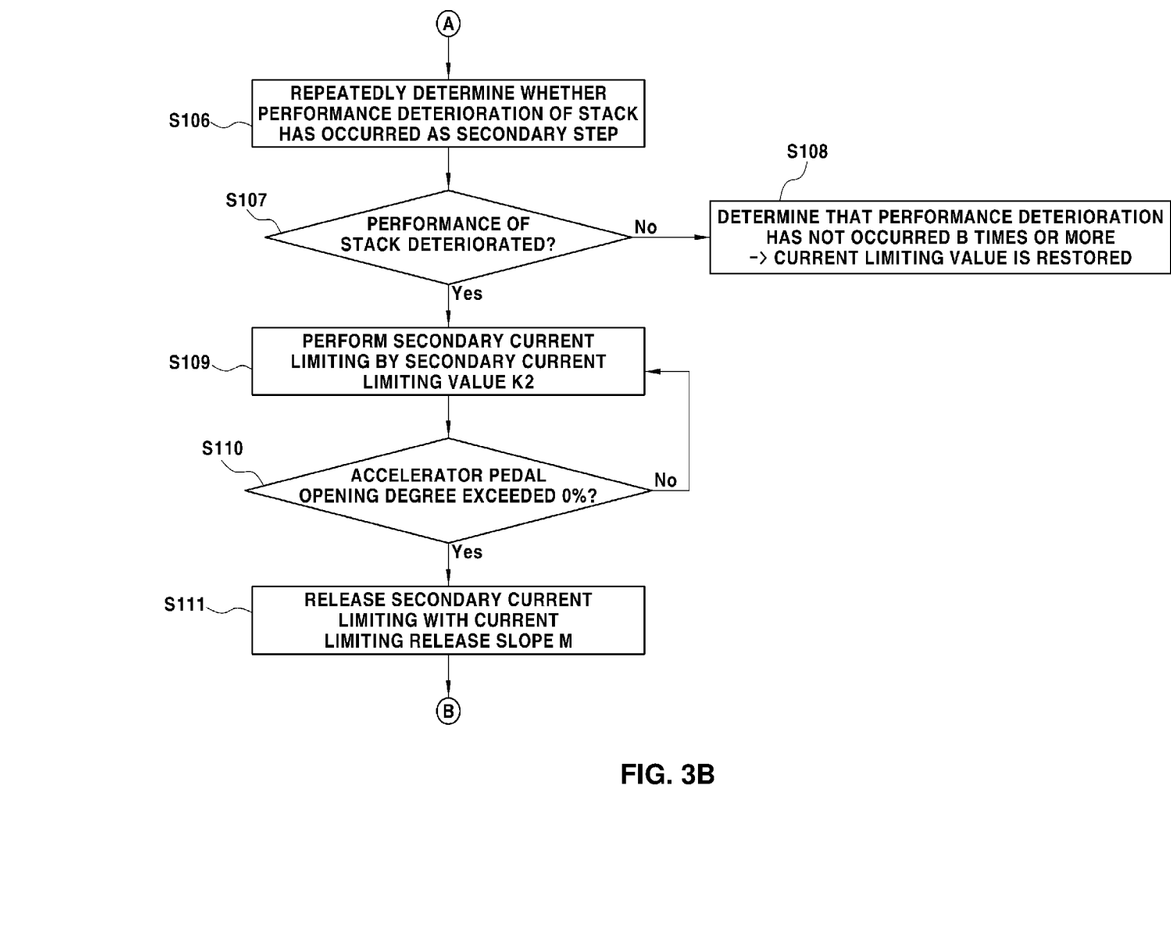
Figure 3C:
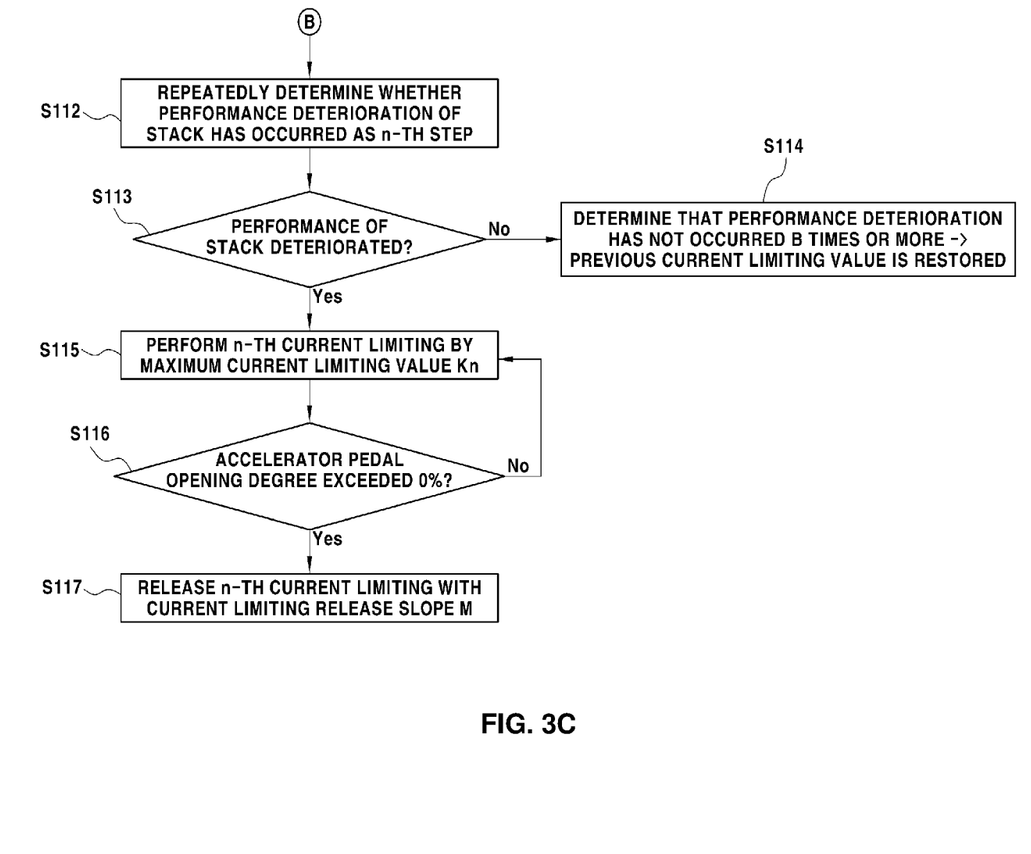

FIG. 2 is a view showing a control configuration for a current limiting method of a fuel cell stack according to the present disclosure, and FIGS. 3A to 3C are flowcharts illustrating an example of a current limiting method of a fuel cell stack according to the present disclosure.

First, while the fuel cell vehicle travels, a controller 30 repeatedly determines whether performance deterioration of a fuel cell stack has occurred a set number of times A (S101 and S102).

That is, when a sensor unit 20 detects current and a voltage output from the fuel cell stack 10 at an interval of a predetermined travel distance (D km) of the fuel cell vehicle and transmits the current and the voltage to the controller 30, the controller 30 repeatedly determines whether performance deterioration of the fuel cell stack has occurred the set number of times A in advance.

For example, the controller 30 determines that performance deterioration of the fuel cell stack has occurred, when a minimum cell voltage drops below a reference voltage "a" by a first level while the fuel cell stack outputs current in a normal ampere range or when a ratio of a minimum cell voltage to an overall cell average voltage (minimum cell voltage/overall cell average voltage) drops below a reference ratio "b" by the first level, based on the signal of the sensor unit 20.

Next, the controller 30 performs a primary current limiting step of limiting the current to a primary current limiting value K1 lower than the maximum output current of the fuel cell stack by a predetermined level (S103).

That is, the controller 30 limits the output current of the fuel cell stack to the primary current limiting value K1 lower than the maximum output current of the fuel cell stack, which is the maximum current usage value of the fuel cell stack consumed in the driving motor 40 of the fuel cell vehicle, by the predetermined level (K1%).

Subsequently, an accelerator pedal opening degree by driver's operation is checked in order to determine whether the vehicle is accelerated (S104).

That is, in order to determine whether the vehicle is accelerated, the controller 30 receives a detected signal from an accelerator pedal opening degree sensor (not shown) and checks the accelerator pedal opening degree based on actuation by a driver.

Subsequently, upon determining that the accelerator pedal opening degree exceeds 0% and reaches a predetermined opening degree (e.g., 1% to 100%), the controller 30 determines that the vehicle has been accelerated and releases the primary current limiting step with a current limiting release slope M (S105).

Figure 4:
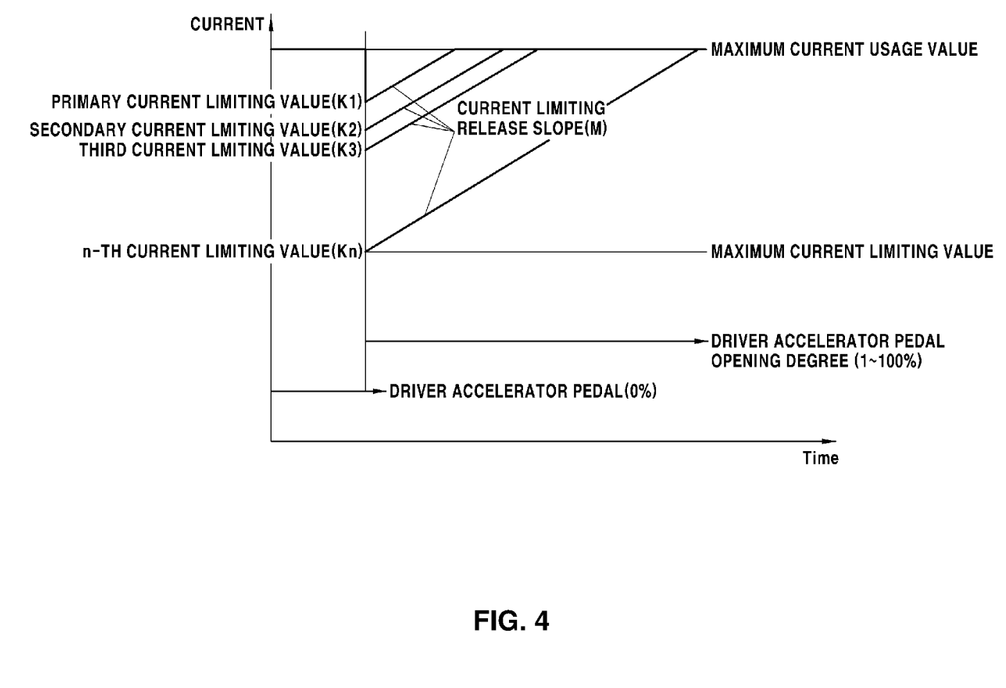
FIG. 4 is a graph showing a current limiting method of a fuel cell stack according to the present disclosure.
Figure 5:
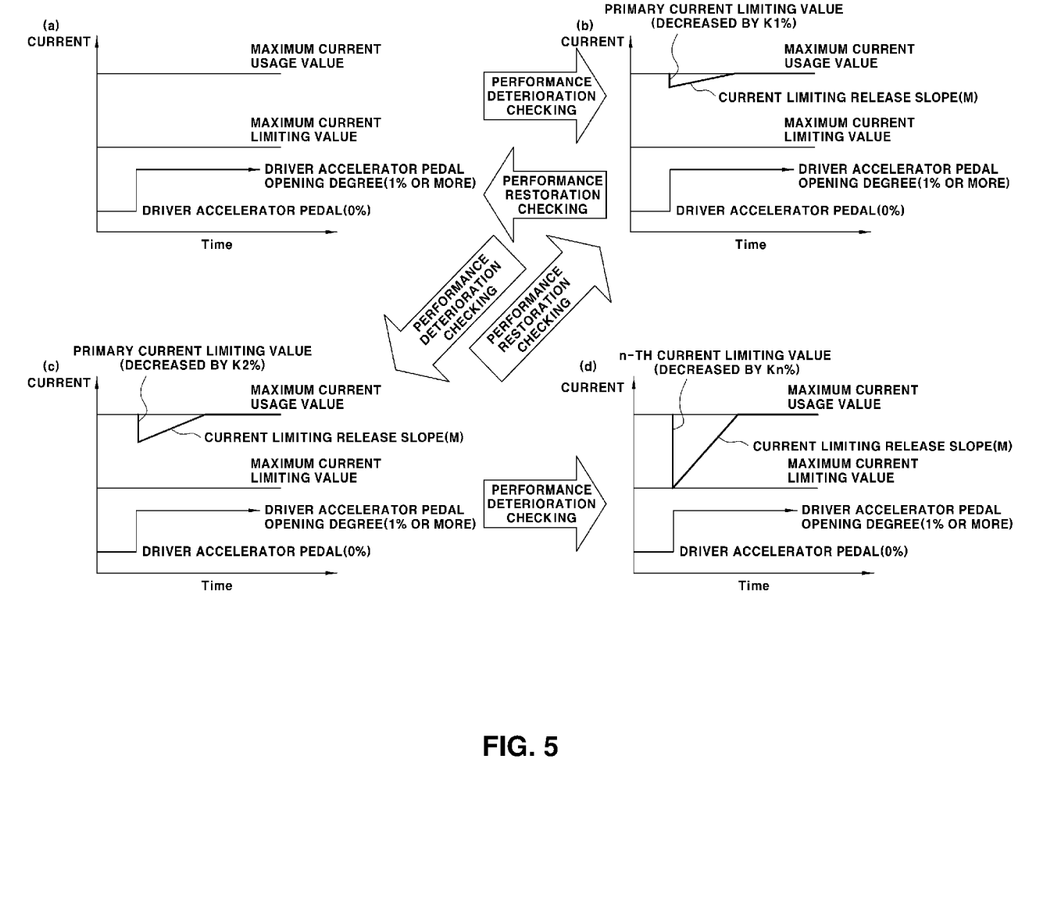
FIG. 5 is a graph showing an example of a current limiting method of a fuel cell stack according to the present disclosure.

As shown in FIGS. 4 and 5(b), when the primary current limiting step of limiting the output current of the fuel cell stack to the primary current limiting value K1 is performed and then is released with the current limiting release slope M, the output current of the fuel cell stack is restored to the maximum output current of the fuel cell stack which is the maximum current usage value of the fuel cell stack consumed in the driving motor.

Upon determining that performance deterioration of the fuel cell stack has occurred, the current of the fuel cell stack is limited before the accelerator pedal opening degree exceeds 0% (before the vehicle is accelerated), the current limiting of the fuel cell stack is released with the predetermined limiting release slope M when the accelerator pedal opening degree becomes a predetermined level or more (e.g., 1 to 100%) to restore the output current of the fuel cell stack to an original level, thereby increasing the output current of the fuel cell stack without instantaneously dropping by current limiting and preventing jerking or shock of the fuel cell vehicle due to instantaneous current drop.

Figure 6:
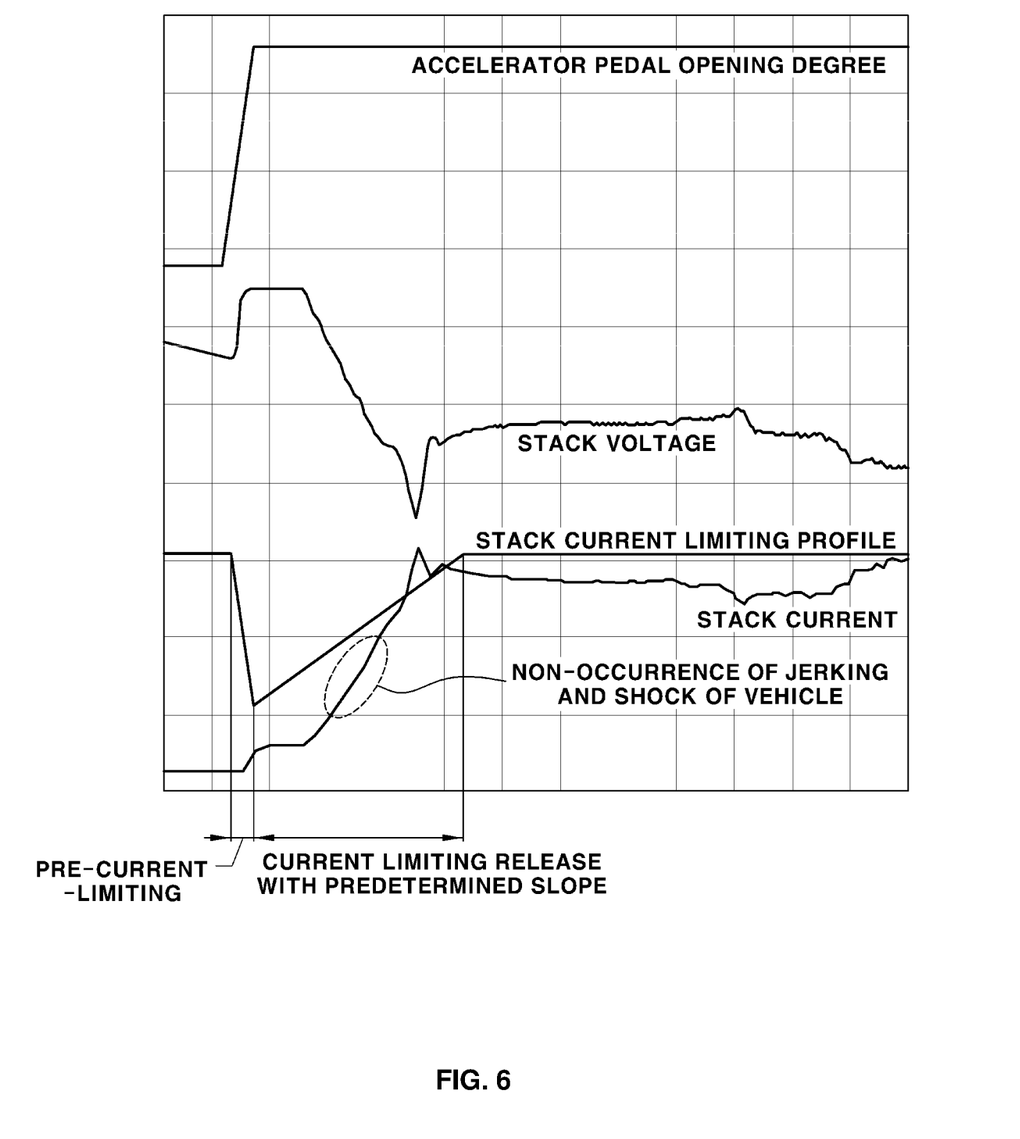
FIG. 6 is a control profile showing a current limiting method of a fuel cell stack according to the present disclosure.

In particular, unlike occurrence of jerking or shock (see the circle denoted by the hidden outline of FIG. 1) of the fuel cell vehicle by instantaneous drop of stack current by the existing current limiting logic, according to the present disclosure, by applying the same test conditions in which the accelerator pedal is pressed at the same opening degree, as shown in a section denoted by arrows in the lower side of FIG. 6, current limiting is released with a predetermined current limiting release slope M after a pre-current-limiting section in which the output current of the fuel cell stack is limited, such that the current of the fuel cell stack gradually increases to the maximum current usage value without instantaneous current drop, thereby easily preventing occurrence of jerking or shock of the fuel cell vehicle.

Meanwhile, whether performance deterioration of the fuel cell stack has occurred may be further determined several times, and secondarily, third and n-th current limiting steps and current limiting release steps may be further performed.

In order to facilitate understanding of the present disclosure, the secondary current limiting and current limiting release steps and the n-th current limiting and current limiting release step will be described herein.

After step S105, the controller 30 repeatedly determines whether performance deterioration of the fuel cell stack has occurred a set number of times B as a secondary step (S106 and S107).

For example, the controller 30 determines that performance deterioration of the fuel cell stack has occurred, when the minimum cell voltage drops below a reference voltage "a" by a second level lower than the first level while the fuel cell stack outputs current in a normal ampere range or when the ratio of the minimum cell voltage to the overall cell average voltage (minimum cell voltage/overall cell average voltage) drops below the reference ratio "b" by a second level lower than the first level while the fuel cell stack outputs current in a normal ampere range, based on the signal of the sensor unit 20 for detecting the current and voltage of the fuel cell stack.

In contrast, upon determining that performance deterioration of the fuel cell stack has not occurred in steps S106 and S107, the controller restores the current limiting value of the fuel cell stack to the maximum current usage value (S108).

Preferably, upon determining that performance deterioration of the fuel cell stack has not occurred in steps S106 and S107, the controller restores the current limiting value of the fuel cell stack to the maximum current usage value allowed in a state of initiating the stack.

Subsequently, upon determining that performance deterioration of the fuel cell stack has occurred in steps S106 and S107, the controller 30 performs a secondary current limiting step of limiting current to a secondary current limiting value K2 lower than the maximum output current of the fuel cell stack by a predetermined level and lower than the primary current limiting value K1 (S109).

That is, the controller 30 limits the output current of the fuel cell stack to the secondary current limiting value K2 lower than the maximum output current of the fuel cell stack, which is the maximum current usage value consumed in the driving motor 40 of the fuel cell vehicle, by the predetermined level K2%.

Subsequently, the accelerator pedal opening degree by the driver's operation is checked (S110).

That is, the controller 30 receives a detected signal from the accelerator pedal opening degree sensor (not shown) to check the accelerator pedal opening degree.

Subsequently, upon determining that the accelerator pedal opening degree exceeds 0% and reaches a predetermined opening degree (e.g., 1% to 100%), the controller 30 releases the secondary current limiting step with a current limiting release slope M (S111).

As shown in FIGS. 4 and 5(c), when the secondary current limiting step of limiting the output current of the fuel cell stack to the secondary current limiting value K2 is performed and then is released with the current limiting release slope M, the output current of the fuel cell stack is restored to the maximum output current of the stack which is the maximum current usage value of the fuel cell stack.

Similarly, even when the secondary current limiting and current limiting release step is performed, unlike occurrence of jerking or shock of the fuel cell vehicle by instantaneous drop of stack current by the existing current limiting logic, as shown in a section denoted by arrows in the lower side of FIG. 6, current limiting is released with the predetermined current limiting release slope M after the current limiting section of the fuel cell stack, such that the current of the fuel cell stack gradually increases to the maximum current usage value without instantaneous current drop, thereby easily preventing occurrence of jerking or shock of the fuel cell vehicle.

After step S111, the controller 30 determines whether performance deterioration of the fuel cell stack has occurred as an n-th step such as a third step or higher (S112 and S113).

Preferably, steps S112 and S113 are set as determining steps of limiting the current of the fuel cell stack to a maximum current limiting value by continuously repeating stack current limiting and performance deterioration as described above.

For example, the controller 30 determines that performance deterioration of the fuel cell stack has maximally occurred when the minimum cell voltage drops below the reference voltage "a" by a maximum level while the fuel cell stack outputs current in a normal ampere range or when the ratio of the minimum cell voltage to the overall cell average voltage (minimum cell voltage/overall cell average voltage) drops below the reference ratio "b" by a maximum level, based on the signal of the sensor unit 20 for detecting the current and voltage of the fuel cell stack.

In contrast, upon determining that performance deterioration of the fuel cell stack has not occurred in steps S112 and S113, the controller restores the current limiting value of the fuel cell stack to the level used in the previous current limiting step (S114).

Subsequently, upon determining that performance deterioration of the fuel cell stack has maximally occurred in steps S112 and S113, the controller 30 performs an n-th current limiting step of limiting the current to an n-th current limiting value Kn which is the maximum current limiting value of the fuel cell stack (S115).

Therefore, the stack outputs current to a level suited to the maximum current limiting value.

Subsequently, the accelerator pedal opening degree by the driver's operation is checked (S116).

That is, the controller 30 receives a detected signal from the accelerator pedal opening degree sensor (not shown) to check the accelerator pedal opening degree.

Subsequently, upon determining that the accelerator pedal opening degree exceeds 0% and reaches a predetermined opening degree (e.g., 1% to 100%), the controller 30 releases the n-th current limiting step with a current limiting release slope M (S117).

As shown in FIGS. 4 and 5(d), when the n-th current limiting step of limiting the output current of the fuel cell stack to the n-th current limiting value Kn is performed and then is released with the current limiting release slope M, the output current of the fuel cell stack is restored toward the maximum output current of the fuel cell stack which is the maximum current usage value of the fuel cell stack.

Similarly, even when the n-th current limiting and current limiting release step such as the third current limiting and current limiting release step or higher is performed, unlike occurrence of jerking or shock (see the circle denoted by a hidden outline of FIG. 1) of the fuel cell vehicle by instantaneous drop of stack current by the existing current limiting logic, in the present disclosure, by applying the same test conditions in which the accelerator pedal is pressed at the same opening degree, as shown in a section denoted by arrows in the lower side of FIG. 6, current limiting is released with the predetermined current limiting release slope M after the pre-current-limiting section in which the output current of the fuel cell stack is limited, such that the current of the fuel cell stack gradually increases to the maximum current usage value without instantaneous current drop, thereby easily preventing jerking or shock of the fuel cell vehicle.

The present disclosure has the following effects.

First, it is possible to prevent jerking or shock from occurring while a vehicle travels as the current of the fuel cell stack rapidly drops by the existing current limiting method, by determining whether performance deterioration of a unit cell of the fuel cell stack has occurred and employing a feed forward control type current limiting logic of the fuel cell stack.

Second, it is possible to prevent durability of the fuel cell stack from continuously deteriorating as the damage of the unit cell, performance deterioration of which has already occurred, adversely affects overall stack performance, by the existing current limiting logic, and to improve durability of the fuel cell stack.

The disclosure has been described in detail with reference to preferred embodiments thereof. However, it will be appreciated by those skilled in the art that the present disclosure may be implemented in various modifications and alterations via, for example, addition, change or omission of constituent elements without departing from the principles and spirit of the disclosure, and these modifications and alterations are included in the scope of the present disclosure.

What is claimed is:

1. A current limiting method of a fuel cell stack, the current limiting method comprising:
   limiting, by a controller, an output current of the fuel cell stack to a current limiting value lower than a maximum output current of the fuel cell stack by a predetermined level when performance deterioration of the fuel cell stack occurs;
   determining, by the controller, whether a vehicle is accelerated; and
   releasing, by the controller, the current limiting of the fuel cell stack such that the output current of the fuel cell stack is restored to the maximum output current, upon determining that the vehicle is accelerated.

2. The current limiting method of claim 1, wherein the controller determines that performance deterioration of the fuel cell stack has occurred when a minimum cell voltage of the fuel cell stack drops below a reference voltage based on a signal of a sensor unit for detecting current and a voltage of the fuel cell stack.

3. The current limiting method of claim 1, wherein the controller determines that performance deterioration of the fuel cell stack has occurred when a ratio of a minimum cell voltage to an overall cell average voltage (minimum cell voltage/overall cell average voltage) drops below a reference ratio.

4. The current limiting method of claim 1, wherein determining whether the vehicle is accelerated includes the controller checking an accelerator pedal opening degree and determining that the vehicle is accelerated when the accelerator pedal opening degree reaches a predetermined opening degree.

5. The current limiting method of claim 1, wherein limiting the current of the fuel cell stack includes performing a primary current limiting step to an n-th current limiting step.

6. The current limiting method of claim 5, wherein the primary current limiting step includes limiting the output current of the fuel cell stack to a primary current limiting value lower than the maximum output current of the fuel cell stack by a predetermined level.

7. The current limiting method of claim 5, wherein the n-th current limiting step includes limiting the output current of the fuel cell stack to an n-th current limiting value which is a maximum current limiting value of the fuel cell stack.

8. The current limiting method of claim 1, wherein the releasing the current limiting of the fuel cell stack includes increasing and restoring a current limiting value according to the current limiting of the fuel cell stack toward the maximum output current of the fuel cell stack with a predetermined current limiting release slope.

9. The current limiting method of claim 1, wherein when performance deterioration of the fuel cell stack has not occurred, the controller restores the current limiting value of the fuel cell stack to a level used in a previous current limiting step or a maximum current usage value allowed in a state of initializing the fuel cell stack.

10. The currently limiting method of claim 1, wherein the controller limits the output current of the fuel cell stack in the state before the vehicle is accelerated.

* * * * *